United States Patent
Bolle et al.

(10) Patent No.: US 6,851,051 B1
(45) Date of Patent: Feb. 1, 2005

(54) SYSTEM AND METHOD FOR LIVENESS AUTHENTICATION USING AN AUGMENTED CHALLENGE/RESPONSE SCHEME

(75) Inventors: Rudolf Maarten Bolle, Bedford Hills, NY (US); Jonathan Hudson Connell, Cortlandt-Manor, NY (US); Nalini K. Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,645

(22) Filed: Apr. 12, 1999

(51) Int. Cl.[7] .............................. H04L 9/32; G06K 9/00
(52) U.S. Cl. ..................... 713/168; 713/186; 382/115
(58) Field of Search .......................... 713/168, 186, 713/182, 200, 170; 382/115; 705/67

(56) References Cited

U.S. PATENT DOCUMENTS

| | | | |
|---|---|---|---|
| 5,280,527 A | * | 1/1994 | Gullman et al. ............ 713/184 |
| 5,422,953 A | | 6/1995 | Fischer |
| 5,499,294 A | | 3/1996 | Friedman |
| 5,764,769 A | | 6/1998 | Bennett et al. |
| 6,119,096 A | * | 9/2000 | Mann et al. ..................... 705/5 |
| 6,185,316 B1 | * | 2/2001 | Buffam ........................ 382/115 |
| 6,332,193 B1 | * | 12/2001 | Glass et al. .................. 713/170 |
| 6,366,682 B1 | * | 4/2002 | Hoffman et al. ............. 382/115 |

\* cited by examiner

Primary Examiner—Matthew Smithers
(74) Attorney, Agent, or Firm—Louis J. Percello, Esq.

(57) ABSTRACT

An integrated signal sensor with processing power to augment a challenge from server and compute the response is proposed to guarantee that the sensed signal is live and not stored. The sensor-processor computes the response to the augmented challenge based on the signal charactersitics of the sensed signal and then transmits both the signal and the response. The host or the server can verify the response to authenticate liveness of the input image/signal and reject it if the response is different. Areas of application include automated biometrics and remote medical imaging.

27 Claims, 6 Drawing Sheets

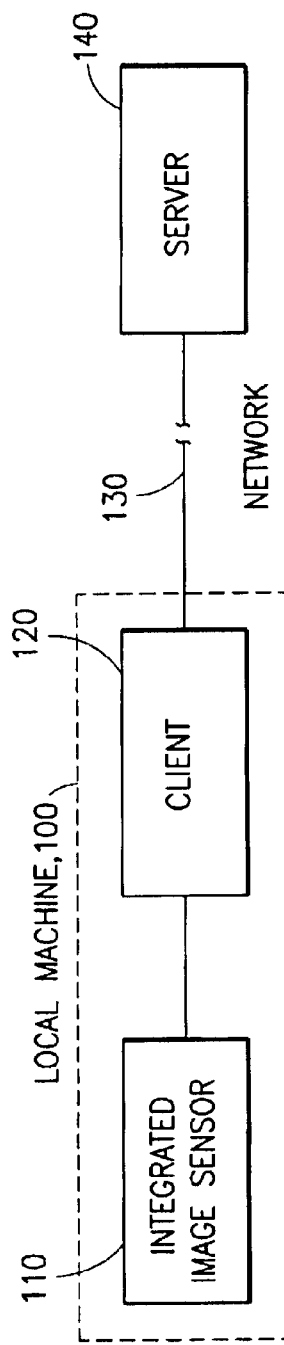
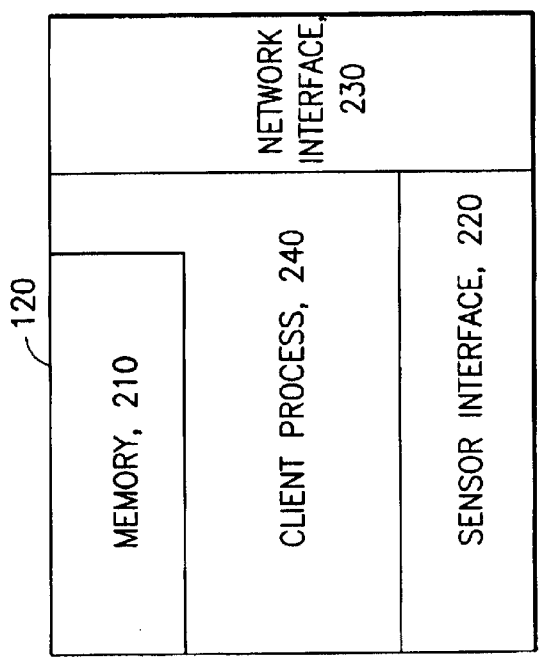
FIG.1
FIG.2

SYSTEM AND METHOD FOR LIVENESS AUTHENTICATION USING AN AUGMENTED CHALLENGE/RESPONSE SCHEME

FIELD OF THE INVENTION

This invention relates to the field of image processing. More specifically, this invention relates to authenticating acquired images using a sensor. More specifically, the invention deals with authenticating the originality of biometrics data like fingerprint images.

BACKGROUND OF THE INVENTION

With the rapid growth of the Internet, many new e-commerce applications are being developed, and deployed. For example, retail purchasing and travel reservations over the web using a credit card are very common commercial applications. Today, the users are recognized using a userId and password combination for identification and authentication purposes. Very soon, more secure methods for authentication and possibly identification involving biometrics, such as fingerprint and face images, will be replacing these simple methods of identification. An automated biometrics system involves acquisition of a signal from the user that more or less uniquely identifies the user. For example, in fingerprint-based authentication a user's fingerprint needs to be scanned and some representation needs to be computed and stored. Authentication is then achieved by comparing the representation of a newly scanned fingerprint to the stored representation. In a speaker verification system a user's speech signal is recorded and some representation needs to be computed and stored. Authentication is then achieved by comparing the representation of a newly recorded speech signal to the stored representation.

In many unattended applications, the server or other computing device has the burden of ensuring that the data transmitted from a client is current and live information, not previously acquired or otherwise constructed or obtained information. With the rapid growth of the Internet, users are expected to be involved in a variety of remote unattended transaction applications. The application server has to ensure that the transmitted information is fresh and has been acquired at the time requested, even more so in the case when any multimedia information is being submitted. It is very easy to store digital multimedia information and recycle the stale information to the server. In many e-commerce applications, if the multimedia information is being used in a time-sensitive fashion, it is very important to ensure the authenticity of the multimedia information for successful operation of the system.

One of the main advantages of Internet-based business solutions is that they are accessible from remote, unattended locations including the user's home. However, the biometrics signals can be intercepted or stored on the local machine in these remote and unattended locations or otherwise obtained from applications where the user uses her/his biometrics. The recorded signals can then later be reused for unknown, fraudulent purposes such as to impersonate a registered user of an Internet service. The simplest method is that a signal is acquired once and reused several times. Simple perturbations can be added to this previously acquired signal to give an impression that it is fresh. Detection of such misuse is difficult to determine at the server side. A more sophisticated attacker might create phony Internet businesses and acquire a copy of a user's biometric signal and then with intelligent modifications to the signal, pose as this user to other Internet service providers. The financial implications of such attacks can be substantial.

Fingerprints have been used for identifying persons for several decades. In an automatic fingerprint identification system, the first stage is the image acquisition stage where the subject's fingerprint is sensed. The acquired image is then processed and matched against a stored template. There are several techniques to acquire a fingerprint including scanning an inked fingerprint, and inkless techniques using optical, capacitative and other semiconductor-based sensing techniques. These sensing techniques typically locate ridges and valleys in the fingerprint.

PROBLEMS WITH THE PRIOR ART

There are ways to protect multimedia data and other information during transmission using cryptography techniques. Some well-known cryptographic techniques include RSA, DES, PKI and digital signatures. The crypto techniques running on the client can still be provided with previously acquired images or multimedia data as there is no secure link between the near end of the encrypted communication channel and the image sensor. One way to verify the authenticity of an image is to compute a signature based on that image and transmit it in addition to the image. However, provided the encryption remains secure, all this ensures is that the image was acquired by a valid device. It does not say when it was acquired.

A challenge/response system poses a challenge to the client and verifies the response against the enrolled response. Examples include asking a question like the user's mother's maiden name as the challenge and verifying that the same answer was provided as during enrollment. Challenge/response systems can also be constructed where a secret software algorithm is used to automatically generate a proper response to a digital challenge string. The standard challenge/response approach used in many on-line transaction systems keeps the signal sensor out of the loop. There is still an open path for attack between the image sensor and the processor. That is, one can feed images directly into the processor, bypassing the sensor.

Using encryption methods to securely transmit the biometrics signal deters snooping the network and makes decrypting intercepted transmissions virtually impossible. But locally on the client computer these techniques have no impact.

Today the biometrics sensors such as a camera, fingerprint scanner or a microphone do not have bi directional transmission and do not have the computational capacity to compute any sort of digital signature on the sensor. Yet, any hardware separation between the real sensor and the client computer leaves security holes in the system. In summary, while the prior art can access and securely transmit biometric information/images (fingerprints)—prior art fails to verify that the biometrics information was obtained from the proper source at the proper time.

Friedman (U.S. Pat. No. 5,499,294) describes a digital camera with a processor for authentication of images. The camera stores a private and public key pair to compute a hash function of the image. The hash function can be verified by using the public key. There are no external challenges involved in this system. There is no attempt to guarantee liveness. Also, the adopted mode of cryptography is known to be compute intensive and involve management of the keys.

Haber and Stometta (U.S. Pat. No. 5,136,647) describe a method for secure time stamping a digital document including images and audio signals. The method validates only their temporal existence by using a trusted server-based time stamping scheme. This time stamping is done remotely, not at the source of the signal. The method does not guarantee liveliness of the signal, i.e., if the same signal is sent to system twice with a time interval, the system would validate both of them.

Bennet et al (U.S. Pat. No. 5,764,769) describe a method to authenticate digital video and audio recordings. In their method the authenticating video camera uses the challenge to set the tunable parameters. The trusted repository stores the challenges and the snapshot of the video. In a biometrics system often the best images are obtained by dynamically adjusting the camera or sensor parameters to acquire the best possible image. Hence, setting camera parameters, as would be required by Bennet, is not advisable. Secondly, the system involves a storage server which is not required in a transaction-based system.

These above mentioned patents and the following references, which give further background, are incorporated by reference in their entirety:
Stuart A. Haber and Wakefield S. Stornetta, Jr.,
Method for secure time-stamping of digital documents
U.S. Pat. No. 5,136,647, August 1992
Gary L. Friedman,
Digital camera with apparatus for authentication of images produced from an image file
U.S. Pat. No. 5,499,294, March 1996
Charles Henry Bennet, David Peter DiVincenzo and Ralph Linsker,
Digital recording system with time-bracketted authentication by on-line challenges and method of authenticating recordings
U.S. Pat. No. 5,764,769, June 1998.

OBJECTS OF THE INVENTION

An object of this invention is an improved system and method for authenticating multimedia information signals like images and video.

An object of this invention is an improved system and method for authenticating biometric information like fingerprint images, face images/video, and speech signals.

An object of this invention is an improved system and method for ensuring that the biometric provided/transmitted/sensed is a newly acquired biometric.

An object of this invention is an improved system and method for ensuring that the biometric provided/transmitted/sensed is a biometric newly acquired by a specific sensor.

SUMMARY OF THE INVENTION

The present invention achieves these and other objectives by ensuring that a computer (e.g. a server) authenticates the signal source obtained (e.g. at the client). A challenge/response system is augmented by data from the sensor acquiring the biometric (e.g. fingerprint) and a response is computed on the same physical sensor so that there is a significantly reduced opportunity for tampering. Portions of the augmentation parameters can be easily modified to address the situation where the current algorithm used for computing the response has been uncovered by criminally intended computer hackers.

The system has one or more acquisition devices for creating a representation of one or more input signals. A signal output is connected to one or more application devices. A responder receives the signal representations from the acquisition devices, in response to challenges received from one or more challenge generator devices, and the responder sends responses that are a function of the signals and the challenges. These signal representations can be verified by comparing the responses to the function of the signals and the challenges.

These basic techniques can be extended to acquisition devices generating signal representation from various types of multimedia such as voice and video signals.

BRIEF DESCRIPTION OF THE DRAWING

FIG. 1 is a block diagram of one preferred embodiment of the present invention in a networked application.

FIG. 2 is a block diagram of a client.

DETAILED DESCRIPTION OF THE INVENTION

Figure 3:
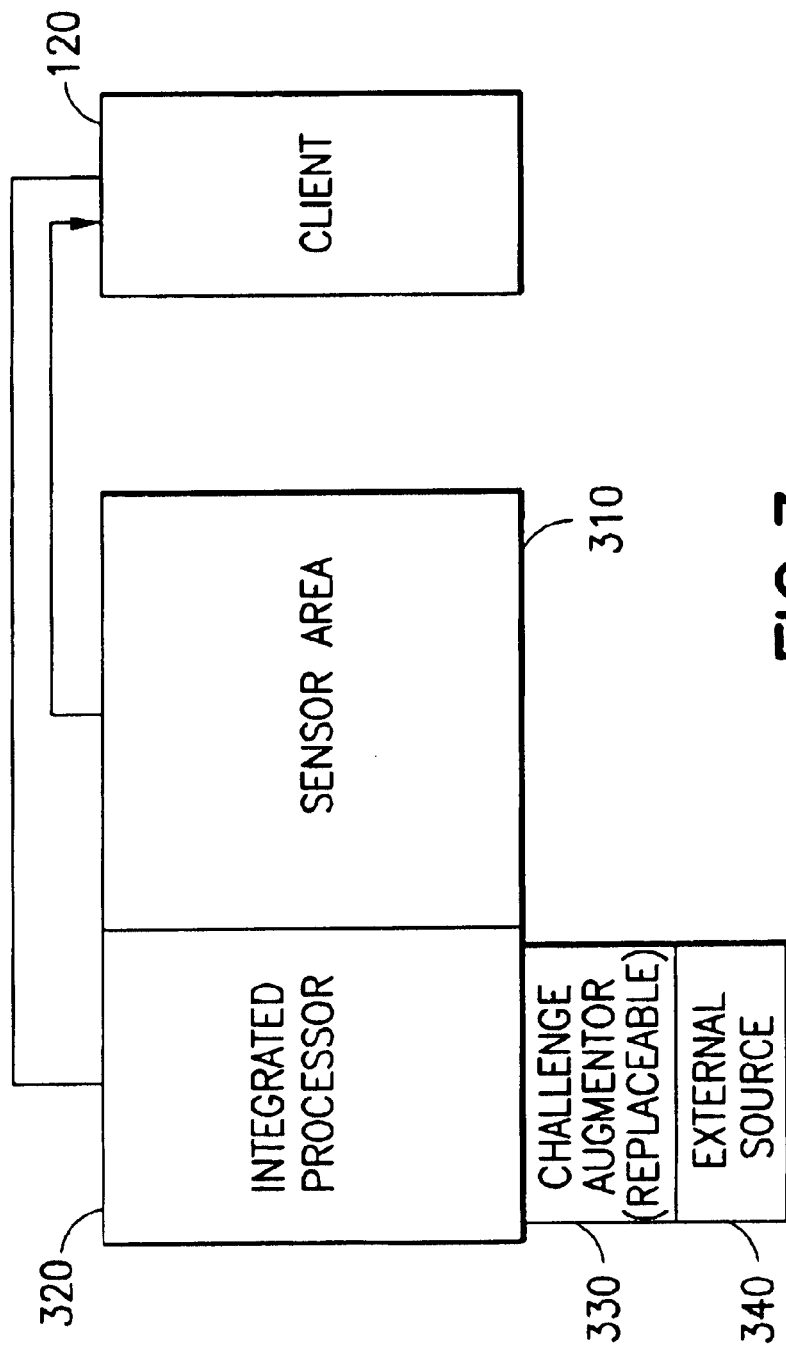
FIG. 3 is a block diagram of a hardware embodiment of a responder in a client.

This invention relates to authenticating acquired images using a sensor. More specifically, it deals with authenticating the originality of biometrics data like fingerprint images. By adding a signature specifically computed from the acquired image in the sensor, authenticity of the image is ascertained. The integrated sensor has the power to augment an external challenge using the image and compute the response to the augmented challenge. Previously acquired or otherwise constructed or obtained digital images being fraudulently resubmitted to a server can be rejected using this technique.

The invention has components on the sensor and other components on the server. The components on the sensor are: (i) a challenge augmentor; and (ii) a response generator. On the server, the components are: (i) a challenge generator, (ii) a response verifier, and (iii) a list of which response algorithm is being used by each client.

In a preferred embodiment, a challenge is an arbitrary string of bits. It is desirable that the challenges repeat very seldom, if ever. It must also be difficult to predict the next challenge from a history of previous challenges or commonly available information such as the time of day. The response generator likewise produces a string of bits which depends on the particular challenge issued. However, in a preferred embodiment, the same challenge should not always generate the same response. It is best if the response generator also considers the properties of the image as well in generating its answer. In effect, the original challenge has been augmented by the complete data of the image to create a new challenge. One scheme is to interpret the challenge as a request to return the intensity values at certain pixel locations specified by the challenge string.

A secondary augmentor can conditionally alter the challenge posed to the client system using locally modifiable parameters. By being able to change the augmentation function as needed, the security of the system is greatly enhanced. One simple secondary augmentation is to add a translation to the selected locations described above.

The server maintains the list of sensors with their secondary augmentation parameters. A somewhat less secure method would have the client send its augmentation parameter directly to the server every time. On receiving the authentication tag, the server verifies the response by first computing the response on the image/signal and the augmented challenge. The augmented challenge is then computed by consulting the table of the sensor and augmentor parameters. Then, if the response and the tag match, the image/signal is considered authentic otherwise it is rejected.

An embodiment of the present invention in a networked application is shown in FIG. 1. The local machine 100 comprises an integrated image sensor 110 and the client 120. The local machine 100 is connected to the server 140 over a network 130. Computers used as clients 120, networks 130, and servers 140 are well known. Sensors 110 include fingerprint scanners, video cameras, still cameras, microphones, iris scanners, hand geometry sensors, and electronic smell sensors.

The client shown in FIG. 2 interfaces with the server through a known network interface 230. The client comprises one or more memories 210 and other known resources needed to execute the client process 240. The sensor interface 220 handles the interactions with the integrated image sensor 110. The sensor interface controls acquisition and sequencing parameters of the sensing device over a data connection such as ISA bus, PCMCIA interface, PCI bus, USB port, RS-232 serial port, parallel port, IEEE 1394 serial bus. The client process 240 is described in FIG. 4.

The block diagram of a hardware embodiment of the sensor and responder in a client is shown in FIG. 3. The sensor area 310 is the physical area for sensing the multimedia signal. The sensor can be a CCD light sensitive device, CMOS electrostatic imager, MEMS pressure transducer. A hardware integrated processor 320 acts as the responder. The integrated processor responds to challenges augmented by the challenge augmentor 330 and the sensed multimedia signal. The challenge augmentor can be easily replaced or reprogrammed so that the challenges can be augmented easily in many different ways. Augmented challenges, in general, are transformed challenges through the means of, for example, a function.

For instance, the augmenter might be able to compute either of two selectable functions, "x1+" and "x10+". Bank A might use unction "x1+" in all its units, while Bank B might use "x10+" in all of its. Or, alternatively, for even number transactions function "x10+" might be used, and for odd numbered transaction "x1+" is used. Hence, the challenge augmenter modifies the challenge through one or more functions. In turn, these functions can be determined by an external source 340. The external source can be a set of switches, a clock, a global position system signal, a pseudo-random number generator and an external computer. In a preferred embodiment the sensor area 310 and integrated processor 320 and challenge augmenter 330 are fabricated on the same piece of silicon. In another preferred embodiment these 3 pieces are enclosed in a tamper-resistant module that may be of a conventional design; e.g. a wire-embedded epoxy package in which intrusion is sensed by a change of the electrical resistance of the wire.

Figure 4:
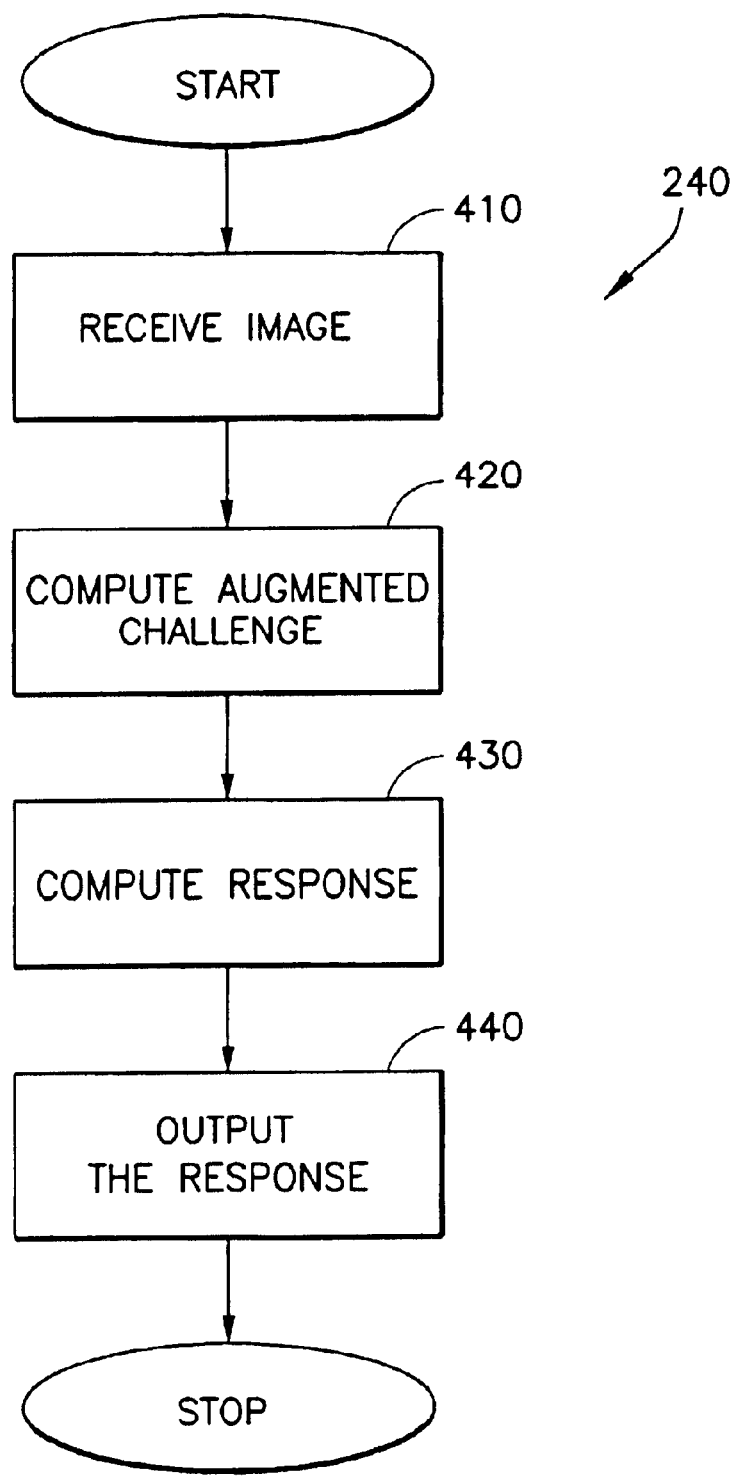
FIG. 4 is a flow chart of a challenge responder embodied as a process in the sensor at the client.

FIG. 4 is a flow chart of the client process 240 running on the integrated processor 320. The client process receives the image (or multimedia signal) in step 410. On receiving the challenge the augmentor in step 420 combines this with data from the image, then in step 430 computes a valid response to the augmented challenge. The response to the challenge is outputted in step 440. A typical challenge might be "3, 10, 50". This would be augmented by appending all the pixels values of the image (in scan order) to the end of the challenge string. The client process then selects the 3rd, 10th and 50th pixel value from this sequence to generate an output response such as "133, 92, 176". Other examples of responder function includes computing a checksum of a segment of the signal, a set of pseudo-random samples, a block of contiguous samples starting at a specified location and with a given size, a hash of signal values, and a specified known function of selected samples of the signal. A combination of these functions can be used to achieve arbitrarily complex responder functions.

Figure 5:
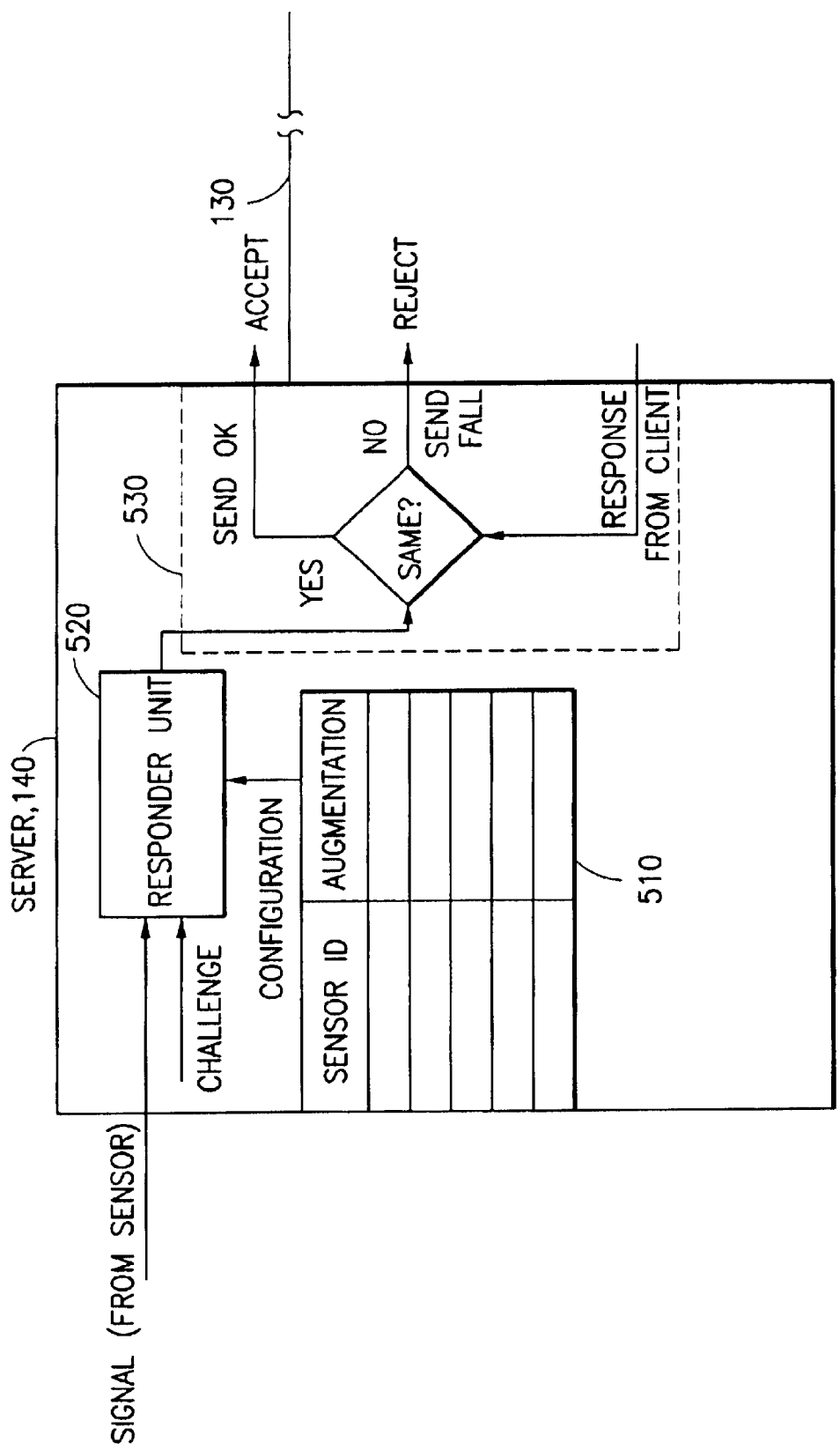
FIG. 5 is a block diagram of a preferred server.

A preferred embodiment of a server 140 is shown in FIG. 5. Over the network 130, the server receives the signal and the response from the client. In a table 510 or by other methods, the server stores the augmentation configuration for each sensor. The responder unit 520 computes the response to the augmented challenge and the signal. If the response comparator 530 finds the response received from client and the responder unit 520 to be same, it outputs OK or accepts the multimedia signal. Otherwise, the response comparator returns an error or rejects the multimedia signal sent for validation. Continuing with the above example, the server knows that the challenge "3, 10, 50" has been issued. It also has access to the full digital image (typically sent in the clear). It then uses its secret knowledge of client process 240's responder program to interpret the challenge to mean the 3rd, 10th, and 50th pixel of the image (as opposed to, say, the 30th, 100th, and 500th pixel). So the server also generates the response "133, 92, 176" and checks if this matches what was sent along with the image.

Figure 6:
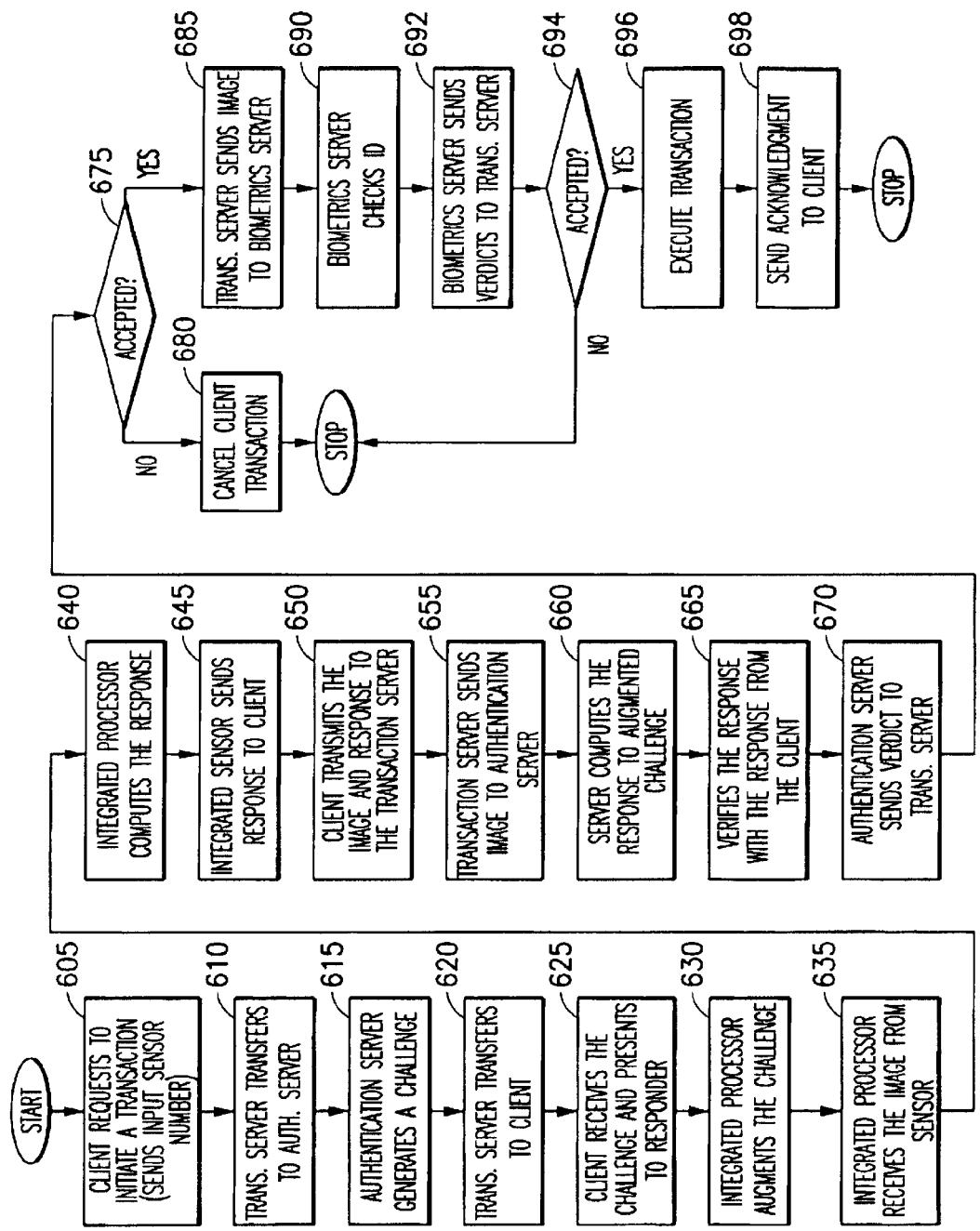
FIG. 6 is a flow chart a transaction process as performed by the server.

A business process based on the invention is presented in FIG. 6. The clients initiates a request to start a transaction by sending the sensor number to the server in step 605. For instance, a customer wishes to purchase a shirt at a departmental store using a credit card. The local store terminal reads the credit card and transmits the credit card number and the transaction amount to the transaction server. The transaction server then requests a challenge from the authentication server in step 610. The authentication server generates a challenge such as "3, 10, 50" in step 615 and communicates to the transaction server. The transaction server in turn transmits the challenge to the client (i.e., the local store terminal) as shown in step 620.

On receipt of the challenge by the client, the integrated sensor and responder is presented with the challenge in step 625. The integrated sensor senses the image (or signal) in its sensing area in step 630. For instance, the digital representation of the ridges and valleys of the fingerprint is formed. The challenge gets augmented in step 635 by the integrated processor using the replaceable challenge augmentor. For example, the challenge augmenter could be the function "x10+" which takes the original challenge "3, 10, 50" and converts it to "30, 100, 500" and also appends all the pixels values in the acquired image to form, in effect, a new, more complicated challenge. The response to the augmented challenge is computed (e.g., "133, 92, 176") in step 640 and is communicated to the client in step 645. The client (i.e., local store terminal) transmits the signal (e.g., fingerprint image), the response to the challenge, and the sensor identification number (e.g., "S/N 1234") to the transaction server in step 650.

On receipt of the signal, response and id, the transaction server transmits all the parts to the authentication server in step 655. In step 660, the authentication server computes the response to the augmented challenge and compares with the response received from the client in step 665. To do this, it first looks up the augmentation function being used by the store terminal (i.e. sensor ID "S/N 1234" is registered as using function "x10+"). It then augments the challenge it issued in the appropriate way and computes the expected response ("3, 10, 50" becomes "30, 100, 500" which results in "133, 92, 176"). If this matches the transmitted response, the authentication server knows that the associated image was taken in response to the issued challenge and hence is newly acquired, not a resubmitted stored image.

Using step 670, the authentication server communicates the verdict to the transaction server. If the verdict was not to accept (step 675), the client transaction is canceled in step 680. In our example, the customer would be denied his new shirt. It might also be desirable to record for later investigation the fact that a presumably non-live image was received purportedly from that particular store or of that particular customer. Otherwise, in step 685 the transaction server transmits the image (signal) to the biometrics server.

The biometrics server matches the features of the signal with the template database in step 690 and send its verdict to the transaction server in step 692. This step typically involves the comparison of the signal to a stored biometrics representation. For instance, are the minutiae from the fingerprint image (signal) in approximately the same location as those on file for the customer requesting the transaction.

If the verdict is to accept, the transaction server executes the transaction in step 696 and sends an acknowledgment to client in step 698 and completes the transaction. Otherwise, control is transferred to step 680 where the transaction is canceled.

Figure 7:
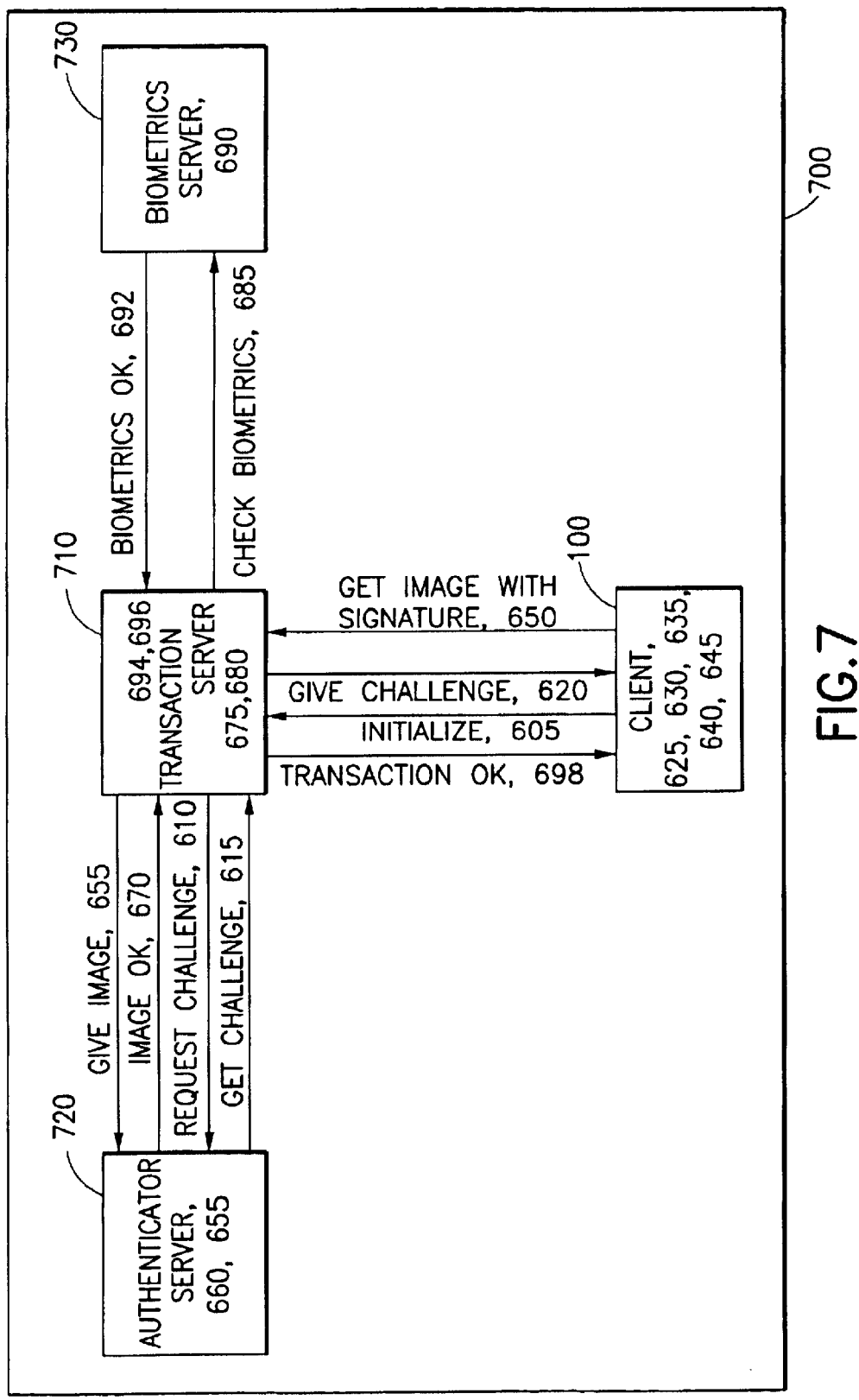
FIG. 7 is hardware embodiment of a three server model-based business process.

FIG. 7 shows a hardware configuration of a business process involving the interaction between a client 100 and three servers: a transaction server 710, an authentication server 720, and a biometrics server 730. The various messages exchanged between the machines serve to implement the various steps of the Flowchart in FIG. 6 as indicated. Some of the steps are performed wholly within a single server as indicated by the step numbers within each box in the figure.

The business process 700 is that 710 is a transaction business where a transactor performs transactions such as purchases or service transactions, like bank statements. The transactor has to be authenticated through some biometrics. Business 720, which could be independent from business 710, on the other hand, validates that the biometrics is acquired by the right sensor at the right time. This is because the sensors are registered on server 720 and 720 challenges the sensor in client 100. Business 730 authenticates the transactor's biometrics. The transactor has registered her biometrics with 730 and 1:1 biometrics matching is performed at 730.

Business 720 does not necessarily have to only deal with transaction business 710. It can interact with a plurality of truncation servers. Similarly, biometrics authentication business can interact with more than one transaction businesses 730. Business 720 and business 730 can be combined into one business that offers its services to multiple transaction servers. Server 710, 720 and 730 can be combined into one. At the same time, 710 can employ multiple authentication servers and multiple biometrics servers.

Business process 700 can be implemented with a variety of biometrics, such as fingerprints, face, iris, voice. It can also use one or more fingerprints, two irises or combinations of these biometrcs.

We claim:

1. A system for generating a response from an acquired signal and a challenge, the system comprising:
    an acquisition device for creating a signal representation of said acquired signal; and
    a responder that receives said challenge and generates said response that is a function of said signal representation, wherein said function is defined by said challenge.

2. A system, as in claim 1, where the acquired signal is one of the following: a biometric signal, a fingerprint image, a face image, an iris image, an audio signal, and a speech signal.

3. A system, as in claim 1, where the acquisition device is one of the following: a camera, a biometrics sensor, a semiconductor-based fingerprint sensor, a micro-mechanical sensor, and a microphone.

4. A system, as in claim 1, where the responder has two or more selectable functions, the selectable functions being selected by one or more configuration inputs and the selectable functions modifying the challenge.

5. A system, as in claim 4, where the configuration inputs are connected to an external source that selects the selectable function.

6. A system, as in claim 5, where the external source includes one or more of the following:
    a set of switches, a jumper block, a clock, a global positioning system signal, an external computer, and a pseudo-random number generator.

7. A system, as in claim 1, where the responder function includes one or more of the following: a checksum, a pseudo-random sample, a block of contiguous samples, and a function of selected samples of the signal.

8. A system, as in claim 1, where the acquisition device and the responder are both located on a single semiconductor chip.

9. A system, as in claim 1, wherein said challenge identifies said function from two or more functions.

10. A system, as in claim 1, wherein said challenge identifies one or more parameters of said function.

11. The system, as in claim 1, wherein said signal representation can be verified by comparing said response to said function of the signal representation and the challenge.

12. A method for generating a response from an acquired signal and a challenge, comprising the following steps:
    creating a signal representation of said acquired signal;
    receiving said challenge; and
    creating said response that is a function of the signal representation, wherein said function is defined by said challenge.

13. A method, as in claim 12, wherein said challenge identifies said function from two or more functions.

14. A method, as in claim 12, wherein said challenge identifies one or more parameters of said function.

15. A computer product for generating a response from an acquired signal and a challenge that performs the following steps:
    creating a signal representation of said acquired signal;
    receiving said challenge; and
    creating said response that is a function of the signal representation, wherein said function is defined by said challenge.

16. A business process for authenticating an acquired signal, the process comprising the steps of:
    creating a signal representation of said acquired signal;

creating a challenge;

creating a response that is a function of the signal representation, wherein said function is defined by said challenge; and authenticating the signal representation by comparing the response to the function of the acquired signal.

17. A business process, as in claim 16, where the acquired signal includes any one of the following: a fingerprint, face, iris, and voice.

18. A business process, as in claim 16, where the challenge response functions include any one or more of the following: signal values at discrete points, a mathematical function of discrete signal values, a hash of the signal values, and a checksum of the signal values in a delimited area.

19. A business process, as in claim 16, wherein said challenge identifies said function from two or more functions.

20. A business process, as in claim 16, wherein said challenge identifies one or more parameters of said function.

21. A system for authenticating an acquired signal, comprising:

a challenge generator for generating a challenge; and a verifier for authenticating a received signal by comparing a function of the acquired signal, wherein said function is defined by said challenge, to a response generated as a result of said challenge.

22. A system, as in claim 21, wherein said challenge identifies said function from two or more functions.

23. A system, as in claim 21, wherein said challenge identifies one or more parameters of said function.

24. A method for authenticating an acquired signal, comprising the following steps:

creating a challenge; and authenticating a received signal by comparing a function of the acquired signal, wherein said function is defined by said challenge, to a response generated as a result of said challenge.

25. A method, as in claim 24, wherein said challenge identifies said function from two or more functions.

26. A method, as in claim 24, wherein said challenge identifies one or more parameters of said function.

27. A computer product for authenticating an acquired signal that performs the following steps:

creating a challenge; and authenticating a received signal by comparing a function of the acquired signal, wherein said function is defined by said challenge, to a response generated as a result of said challenge.

\* \* \* \* \*